United States Patent [19]

Corter

[11] 4,054,123
[45] Oct. 18, 1977

[54] PORTABLE FIREPLACE GRILL ASSEMBLY FOR USE WITH AN OPEN FIREPLACE

[76] Inventor: Dale E. Corter, R.D. No. 1, Allenwood, Pa. 17810

[21] Appl. No.: 668,377

[22] Filed: Mar. 19, 1976

[51] Int. Cl.² .......................................... F24B 1/26
[52] U.S. Cl. .................................. 126/137; 99/446; 126/25 R
[58] Field of Search ............ 126/137, 30, 25 R, 25 A, 126/9 R; 99/444, 446

[56] References Cited

U.S. PATENT DOCUMENTS

| | | | |
|---|---|---|---|
| 706,502 | 8/1902 | Van Wie | 126/25 A |
| 2,629,315 | 2/1953 | Schaar | 126/137 X |
| 2,844,139 | 7/1958 | Lucas | 126/30 |
| 2,998,001 | 8/1961 | Lofgren et al. | 126/25 A |
| 3,455,291 | 7/1969 | Glass | 126/137 |
| 3,641,922 | 2/1972 | Nachazel et al. | 126/137 |

FOREIGN PATENT DOCUMENTS 802,369   10/1958   United Kingdom ................. 126/30

*Primary Examiner*—William F. O'Dea
*Assistant Examiner*—Harold Joyce
*Attorney, Agent, or Firm*—Sughrue, Rothwell, Mion, Zinn and Macpeak

[57] ABSTRACT

An open rectangular box frame supports a removable open top drip pan on a fireplace hearth immediately in front of the fireplace fire box. A modified rectangular grill frame is pivotably mounted to and above the box frame at one rear corner and supports a removable grill. The grill rotates from a position within the fire box and above the flame to a position outside of the fire box and overlying the drip pan.

4 Claims, 4 Drawing Figures

PORTABLE FIREPLACE GRILL ASSEMBLY FOR USE WITH AN OPEN FIREPLACE

BACKGROUND OF THE INVENTION

1. FIELD OF THE INVENTION

The present invention relates to grills, and more particularly to a portable grill assembly, preferably used in conjunction with a home fireplace which eliminates the staining of the hearth during turning of the food being grilled or removal of the same from the grill.

2. DESCRIPTION OF THE PRIOR ART

In attempting to reduce energy consumption, home owners have attempted to cook a portion of their food within the home open fireplace on a grill which supports the food at a given position above the underlying fire within the fireplace fire box. Typical outdoor cooking grills cannot be accommodated within the relatively small dimensions of the fireplace fire box and its opening. Further, attempts to use a grill of small size capable of being inserted within the fireplace opening have been complicated by the necessity of placement and removal of the food on the grill, and turning the food (normally meat). This requires reaching over the fire, a dangerous and uncomfortable practice for the cook. Further, in removing or turning over food such as meat during the process of cooking, grease or other drippings tend to fall on the hearth immediately in front of the fire box and exterior of the opening.

It is an object of the present invention to provide an improved, portable, compact easily assembled and disassembled, light weight fireplace grill assembly, preferably provided with a removable grill and drip pan for easier cleaning and being of the type where food is readily turned over or removed from the grill without the necessity of reaching over the fire and without problems of staining the hearth during such turning or removal.

SUMMARY OF THE INVENTION

The portable fireplace grill assembly of the present invention for use within an open fireplace having a front hearth opening into a fire box, said assembly comprising an open rectangular box frame supported at a given height above the fireplace hearth by fixed legs at respective corners. A shallow open drip frame is mounted on said box frame for pivotable movement about a vertical axis at one corner of the box frame and removably supports a horizontal, open grill allowing the grill frame to pivot from a first position overlying the drip pan to a second position within the fireplace fire box and overlying the fire.

The legs may comprise three vertical solid rods, two fixed to respective inside corners at the front of the box frame and to one rear corner, and a fourth elongated rod fixed to the other outside rear corner including a portion extending above the upper edge of the box frame. The grill frame preferably includes a vertical tube mounted to a corresponding corner of the grill frame and rotatably receiving the extending end of said fourth elongated rod to define a hinger mounting between the grill frame and the underlying box frame. The tube may be capped at its upper end with the cap resting on the upper end of the rod extension to set the height of the pivotable grill frame. The grill frame may be preferably of a width less than that of the box frame and may be of modified rectangular plan configuration, with the corner of the grill frame diametrically opposite that hinge mounted to the box frame being rounded to insure that all of the grill overlies the drip pan during pivoting of the grill frame from a position within the fire box to a position overlying the drip pan. The lower edges of the sides of the grill frame emanating from the hinge mount corner may taper inwardly towards the upper edge in the direction away from the pivot axis to maximize the grill frame strength at its pivot point while reducing the overall weight of the grill frame. Corner plates carried by the box frame support the removable drip pan while corresponding corner plates at the corners including the rounded corner of the grill frame support the removable grill.

DESCRIPTION OF THE PREFERRED EMBODIMENT

Figure 1:
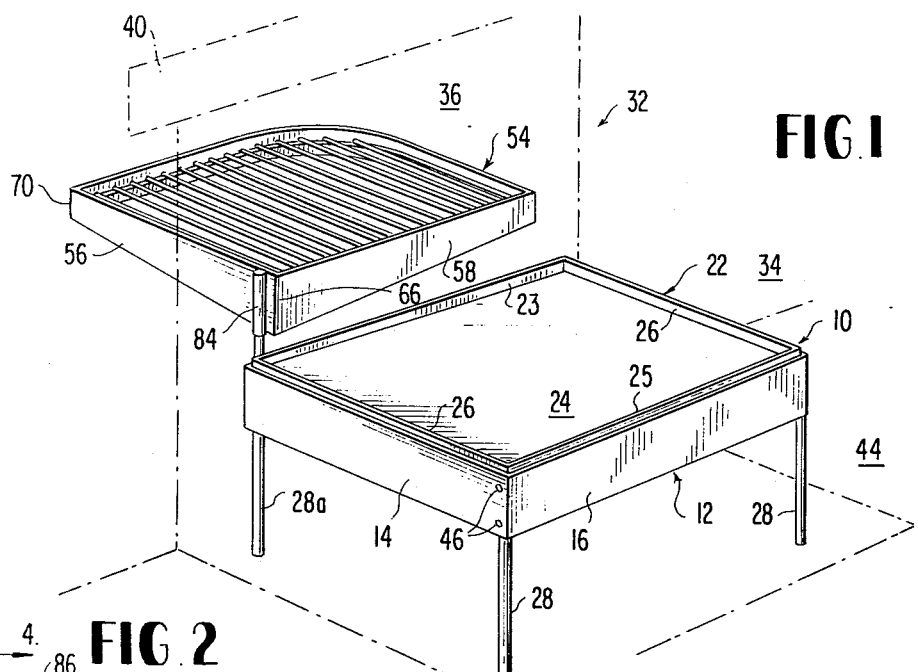
FIG. 1 is a perspective view of the improved portable fireplace grill assembly of the present invention positioned in front of a home fireplace on the front hearth with the grill frame and grill pivoted to projecting position within the fireplace fire box.

Reference to the figures illustrates a preferred form of the improved portable fireplace grill assembly of the present invention, which is indicated generally at 10. A rectangular box frame indicated generally at 12 comprises opposite sidewalls 14 welded at respective edges to front wall 16 and rear wall 18, the walls as well as all of the other elements of the assembly 10 being formed of metal. Walls 14, 16 and 18 are formed of 14 gauge steel sheet stock, and walls in the illustrated embodiment are 4 inches in height, the sidewalls 14 being 19 inches long, while the front and rear walls 16 and 18 each being approximately 22 inches in length. In forming the box frame 12, four flat triangular metal corner plates 20 are welded inside the frame corners at positions approximately ¾ inch down from the upper edge of the box frame walls. This creates a box frame which is extremely rigid and at the same time permits the corner plates 20 to act as corner supports for a rectangular drip pan 22, the drip pan 22 being open at the top, and being provided with a bottom wall 24, rear wall 23, front wall 25 and sidewalls 26. The walls 23, 25 and 26 are approximately one inch in height and extend slightly above the upper edge of the box frame walls. The box frame 12 is supported by equal length legs 28. The legs are all formed of ¾ inch rod stock of a height approximately 12 inches long with the exception of rear leg 28a, which is longer.

As easily seen in FIG. 1, the improved portable fireplace grill assembly 10 is preferably employed in cooking meat or other food over an open fire F within a conventional fireplace indicated generally at 32 within a residence or the like. In this respect, the residence comprises a wall 34 with the fireplace 32 being mounted within that wall and forming a generally rectangular fire box 36 internally of the fireplace opening 38, the fireplace being completed in conventional manner by a mantel 40 and having a front hearth 42 immediately in front of opening 38, the hearth comprising fire brick, stone or the like, and forming a portion of the floor 44 of the building housing fireplace 32. It is upon the hearth 44 that the legs 28 and 28a of the fireplace grill assembly 10 rest. Three of the legs 28 are set inside the frame corners beneath the corner plates 20, preferably being bolted to one of the sidewalls 14 by bolts 46 which extend through holes (not shown) in the upper ends of the legs 28, while with nuts 48 threadably threaded to the inner ends of the bolts 46. The fourth leg 28a is vertically extended to a height above that of the other legs, the fourth leg being mounted at the rear of the box frame 12. In the illustrated embodiment, leg 28a is approximately 18 inches in length and is bolted to the box frame in the same manner but to the outside of the rear wall 18 of the box frame 12 adjacent the left hand rear corner, FIG. 1. It is evident that several legs 28' of different length may be provided to permit adjustment to the height of the grill 50 which is rotatably supported at the upper end of leg 28' for movement into position above the fire 52 within the fire box 36 or in a position overlying the drip pan 22. In this respect, the grill 50 is supported by a modified rectangular grill frame indicated generally at 54, the grill frame 54 being formed by a pair of tapered metal sidewalls 56 and 58 which narrow in a direction away from the vertical pivot axis 60 defined by leg 28', the outer ends of the sidewalls 56 and 58 being joined by a wall 62 of uniform reduced height forming a rounded corner at 64 diametrically opposite the corner 66 formed by the abutting ends of sidewalls 56 and 58. The grill frame 54 has a height at the pivot point which is approximately twice that at the outer edge of sidewalls 56 and 58. The additional height is needed near the pivot point and provides sufficient rigidity to the pivotable grill frame 54 and the taper is provided to the sidewalls 56 and 58 to reduce the overall weight of the grill frame 53. At corners 66, 68 and 70, the grill frame is provided with flat triangular corner plates 72 welded to the corners of abutting sidewalls below the upper edge similar to the corner plates 20 of the underlying box frame. The corner plates 72 act along with a narrow strip or support plate 74 which is welded to the rounded edge 64 of wall 62 at a point diametrically opposite the corner 66 of the grill frame to support removable grill 50. The grill 50 comprises an open frame 80 formed of metal rod material across which extend spaced, parallel rods 82 which are welded at their ends to framework 80 to complete the grill 50. The grill is readily removable, being simply gravity supported at its corners by plates 72 and 74.

The grill frame 54 is pivotably mounted to the box frame 12 at the left rear corner, being supported for pivotable movement by means of a mounting tube 84 having an internal diameter slightly larger than the diameter of the leg 28a. The metal tube 84 is preferably welded vertically to the outside of the grill frame wall 56 adjacent corner 66. Preferably, a thin metal cap 86 is welded to the upper end of the tube 84 which prevents the tube 84 from sliding down leg 28a. Normally, the bottom of the tube never contacts the upper edge of the box frame 12 at the left rear corner. In some cases, such contact is sufficient to effect pivotable mounting of the grill frame to the box frame 12. The thin sheet metal cap 86 is welded to the top of tube 84 to maintain the grill frame spaced above the box frame 12 a predetermined distance when the grill frame is pivoted into an overlying position with respect to the drip pan 22. Preferably, the drip pan 22 is approximately ¾ inches in height in the illustrated embodiment, and both the pan and the grill are dimensioned to fit loosely within respective frames so that they are merely set in place for easy removal and cleaning subsequent to use of the fireplace grill assembly in the cooking of food.

Figure 2:
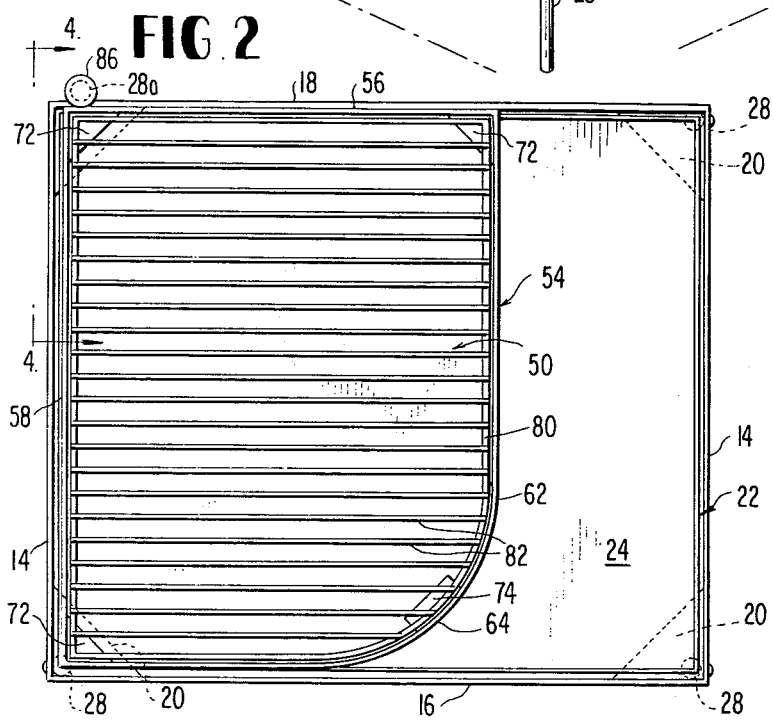
FIG. 2 is a top plan view of the portable fireplace grill assembly of FIG. 1 with the pivotable grill overlying the drip pan.
Figure 4:
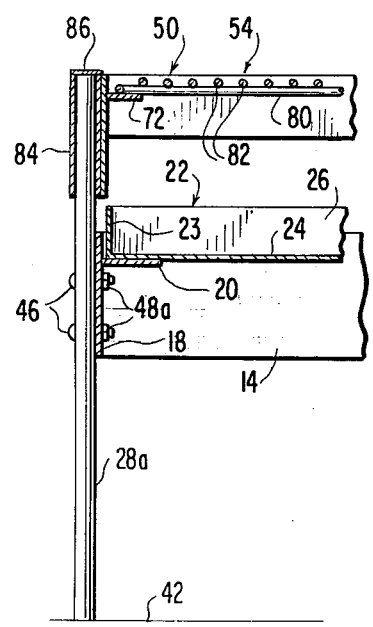
FIG. 4 is a sectional view of a portion of the fireplace grill of FIG. 2 taken about line 4—4.
Figure 3:
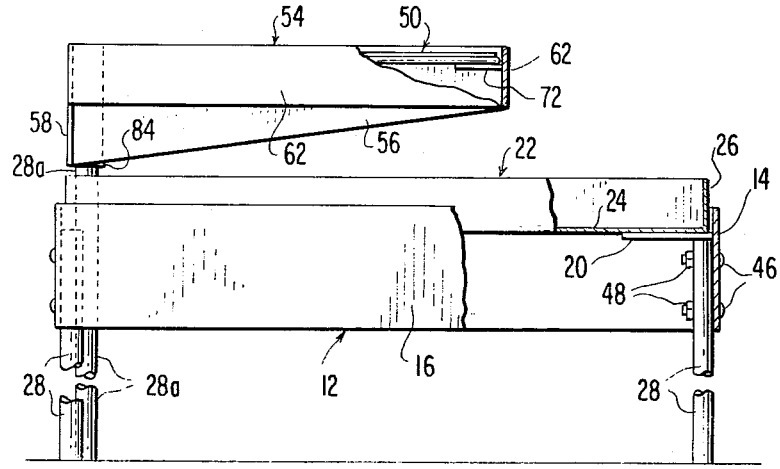
FIG. 3 is a left side elevational view partially in section of the fireplace grill of FIG. 2.

As may be seen, a very distinct advantage of the fireplace grill assembly of the present invention is that it may be used in such a manner that in turning over or removing the food, such as a steak or the like, the grill frame 54 is simply pivoted about the vertical pivot axis 60 from a position within fireplace opening 38 and within the fire box 36 to a position external of that opening and overlying the drip pan 22. The very act of doing this prevents grease from dripping onto the hearth 42 during rotation, since the grill, in rotating from the position shown in FIG. 1 to the position shown in FIGS. 2, 3 and 4, always has an area of the drip pan underlying the same. Preferably, the width of the grill frame 54 is less than the width of the box frame 12, and the corner 64 is rounded such that during pivotable movement about the vertical pivot axis 60, no portion of the grill is exposed directly to the underlying hearth 44, preventing drippings from reaching the same during such pivotable movement into and out of the fireplace fire box.

In the illustrated embodiment, all parts are formed of steel for maximum strength and resistance to heat. The total weight of the unit in terms of the dimensions given is approximately 28 pounds, the assembly may be shipped knocked down and easily assembled with the use of simple tools such as screw driver and pliers. The assembly may be employed with any fireplace having a minimum front opening of 28 inches in width and 20 inches in height. Since the average fireplace front opening is 35 inches in width and 27 inches in height, the grill assembly will operate over most wood and coal grates or andirons, and the grill can support up to 8 pounds while cooking without danger of tipping. The grill assembly which is approximately 14 inches in width and 18 inches in length, may accommodate four large steaks, or six medium steaks, or 12 hamburgers or 30 hot dogs, and the grill can be used to cook food within sauce pans or small frying pans or directly on the grill 50.

While the invention has been particularly shown and described with reference to a preferred embodiment thereof, it will be understood by those skilled in the art that various changes in form and details may be made therein without departing from the spirit and scope of the invention.

What is claimed is:

1. A portable fireplace grill assembly for use with an open fireplace including a horizontal hearth external of a vertical fireplace opening and a fire box internally thereof, said fireplace grill assembly comprising:
   an open rectangular box frame,
   legs fixed to the box frame at respective corners for supporting the open rectangular box frame above the fireplace hearth and outside of the fire box,
   said legs comprising vertical rods fixed to the corners of said box frame,
   one of said rods proximal to said fire box extending above the upper edge of the box frame,
   a vertically open, generally horizontal grill frame mounted to said box frame on an upper edge at one rear corner thereof for pivoting about a vertical axis for moving from a first position overlying the drip pan to a second position within said fireplace fire box, said grill frame including a vertical tube fixed to an outside wall of said grill frame at one corner of said grill frame which telescopingly receives the upper end of said one rod to effect pivoting of said grill frame about the axis of said one rod on the upper edge of said box frame, said grill frame having a width parallel to the fireplace opening when overlying the box frame which is less than the width of said box frame and having a length generally equal thereto and having a corner diametrically opposite the corner carrying said tube which is rounded to insure that during pivoting of the grill frame with respect to the box frame that no portion of the grill is directly exposed to the underlying hearth in front of the fireplace opening, a drip pan of a configuration and size corresponding generally to that of the rectangular box frame and removably mounted within said box frame, and a removable grill of a size and configuration corresponding generally to said grill frame and spanning said grill frame opening and removably mounted within said grill frame opening for supporting food to be cooked within said firebox.

2. The portable fireplace grill assembly as claimed in claim 1, wherein said tube is capped at its upper end and said tube is shorter in length than the portion of said rod extending above said box frame such that said grill frame is spaced a predetermined distance above said box frame and the drop pan carried thereby.

3. The portable fireplace grill assembly as claimed in claim 1, wherein said box frame and said grill frame each include horizontal plates at respective corners fixed to said frames at some distance below the upper edge with said plates removably supporting the corners of said drip pan and said grill within said box frame and said grill frame, respectively.

4. The portable fireplace grill assembly as claimed in claim 1, wherein said grill frame has right angle intersecting walls at the corner of said vertical tube, and wherein the lower edge of each of said walls tapers inwardly towards the upper edge in a direction away from the pivot axis to maximize the strength of the grill frame at the pivot point defined by the tube, while reducing the overall weight of the pivotable grill frame.

* * * * *